United States Patent [19]

Wu et al.

[11] Patent Number: 5,755,420
[45] Date of Patent: May 26, 1998

[54] SWIVEL BASE STRUCTURE

[75] Inventors: Wei-Chung Wu, Taipei Hsien; Tsung-Jung Hsu, Tao Yuan, both of Taiwan

[73] Assignee: Mag Technology Co., Ltd., Taiwan

[21] Appl. No.: 683,032

[22] Filed: Jul. 16, 1996

[51] Int. Cl.⁶ .................................................. A47G 29/00
[52] U.S. Cl. ........................ 248/371; 248/921; 248/349.1
[58] Field of Search ........................ 248/398, 917, 248/919, 920, 921, 922, 923, 131, 415, 418, 289.11, 349.1, 371, 286.1

[56] References Cited

U.S. PATENT DOCUMENTS

| | | | |
|---|---|---|---|
| 4,554,590 | 11/1985 | Chelin et al. | 248/920 X |
| 4,781,347 | 11/1988 | Dickie | 248/921 X |
| 5,024,415 | 6/1991 | Purens | 248/249.1 |
| 5,209,446 | 5/1993 | Kawai . | |
| 5,465,936 | 11/1995 | Wang | 248/371 |
| 5,588,625 | 12/1996 | Beak | 248/371 |
| 5,632,463 | 5/1997 | Sung et al. | 248/349.1 X |

FOREIGN PATENT DOCUMENTS 94542   6/1994   Taiwan .

*Primary Examiner*—Robert W. Gibson, Jr.
*Assistant Examiner*—Stephen S. Wentsler
*Attorney, Agent, or Firm*—Ostrolenk, Faber, Gerb & Soffen, LLP

[57] ABSTRACT

A swivel base includes a stationary bottom support to be placed on for example a desk and a movable tray movably supported on the fixed bottom support to support thereon for example a monitor. The bottom support has a circular wall having an inclined inner face and the movable tray has a concave member corresponding to and slidably supported on the inclined face. A post located at center of a recess defined by the circular wall with an expanded retaining member fixed thereon. An elongated slot is provided on the concave member and has an widened section to receive the penetration of the retaining member for retaining the post within the slot in a movable manner and to allow the movable tray to rotate about the post. A stop block is provided within the recess defined by the circular wall and a corresponding rib is provided on the underside of the concave member to be contactable with the stop block for limiting the rotation of the movable tray about the post. A slit is formed on the inclined face adjacent to the stop block to define a cantilever type, resilient plate having a free end close to the stop block. The resilient plate is arranged to be contacted and depressed by the rib of the movable tray during mounting the movable tray to the bottom support and to prevent the movable tray from accidently disengaging from the bottom support.

3 Claims, 6 Drawing Sheets

SWIVEL BASE STRUCTURE

FIELD OF THE INVENTION

The present invention relates generally to a swivel structure and in particular to a swivel base for supporting a computer monitor.

BACKGROUND OF THE INVENTION

Computer monitors are usually provided with a swivel base to allow the monitor screen to be oriented toward any desired direction. The monitor swivel base is usually comprised of a three-piece construction. An example of the three-piece monitor swivel base is shown in FIG. 5 of the accompanying drawings, comprising a base plate 1 having a central through hole 12, through which a bolt 14 extends from the undersurface of the base plate 1, with a washer 13 provided between the head of the bolt 14 and the undersurface of the base plate 1, through the hole 12 to engage and secure a rotatable plate 2 on the base plate 1. This allows the rotatable plate 2 to be rotatable relative to the base plate 1.

The rotatable plate 2 has a cylindrically arcuated concave surface 21 on which an arcuate plate 3 having an analogous cylindrically arcuated surface is support. The engagement between the arcuated surface 21 of the rotatable plate 2 and the arcuate plate 3 allows the arcuate plate 3 to slide along the arcuated surface 21 of the rotatable plate 2. A stop block 22 is provided on the arcuated surface 21 and is relatively movably received within an opening 31 formed on the arcuate plate 3 to define the limits of the sliding movement of the arcuate plate 3 relative to the rotatable plate 2. A retaining plate 33 is provided to retain the arcuate plate 3 on the arcuate plate 3 by having screws 32 extending therethrough and engaging threaded holes provided on the stop block 22.

Such a three-piece swivel base, although working well, has a disadvantage of being too complicated to be manufactured in a labor- and cost-effective manner. Further, the three-piece structure requires at least three pieces of parts. This increases the warehousing cost.

Thus, a two-piece swivel base or rotatable bracket was developed, such as U.S. Pat. No. 5,465,936 and Taiwan patent publication No. 234595 which corresponds to the '936 U.S. patent of which an exploded perspective view is shown in FIG. 6 of the attached drawings. The rotatable bracket comprises a base plate 10 and a top plate 20 to be rotatably engaged on the base plate 10. A hemispherical recess 11 is formed on the base plate 10 with two grooves 13 defined thereon. A boss 14 extends upward from a center point of the recess 11 and a post 15 extends from the boss 14. Wings 16 radially extends from the boss 14 at a distance from the recess 11. An annular wall 12 provided on the base plate 10 surrounds the recess 11. The top plate 20 comprises a concave section 24 corresponding to the recess 11 and having an elongated hole 22 and a square hole 23 in communication with each other formed thereon for fitting onto the distance between the wings and the surface of the recess 11 and thus mounting the top plate 20 on the base plate 10. A hook 21 with flat head 211 that defines a semi-circular cutout 212 is provided to shield the square hole 23 for positioning and retaining purpose. L-shaped ears 25 are provided on the top plate 20 for engaging a computer monitor (not shown).

The conventional two-piece swivel base structure has several disadvantages, such as:

(1) In positioning the top plate 20 relative to the base plate 10, the semi-circular cutout 212 is brought to contact the post 15 and if an un-expected great force is applied thereto, the hook 21 on which the cutout 212 is formed may be damaged.

(2) The configuration of the hook 21 that has the cutout 212 is difficult to molded.

(3) In dismounting the top plate 20 from the base plate 10, the flat head 211 has to be manually deformed and the design of the conventional structure may cause damage to the user's fingers and the hook 21.

Thus, it is desirable to have a two-piece swivel base structure which is simple in structure so as to overcome the drawback associated with the three-piece structure and which also overcomes the disadvantages of the prior art two-piece structure.

SUMMARY OF THE INVENTION

It is therefore an object of the present invention to provide a monitor swivel base which comprises a two-piece structure so as to simplify the overall structure and cut down the number of parts and thus the cost.

It is another object of the present invention to provide a two-piece swivel base which comprises an improved design of the retaining mechanism for preventing the two parts of the swivel base from accidently disengaging from each other, such retaining mechanism being more flexible and tougher so as not to be damaged during the relative rotation or the mounting/dismounting process.

It is a further object of the present invention to provide a two-piece swivel base which comprises a manual control tab much easier to handle as compared to the conventional design.

To achieve the above objects, there is provided a swivel base comprising a stationary bottom support to be placed on for example a desk and a movable tray movably supported on the fixed bottom support to support thereon for example a monitor. The bottom support has a circular wall having an inclined inner face and the movable tray has a concave member corresponding to and slidably supported on the inclined face. A post located at center of a recess defined by the circular wall with an expanded retaining member fixed thereon. An elongated slot is provided on the concave member and has an widened section to receive the penetration of the retaining member for retaining the post within the slot in a movable manner and to allow the movable tray to rotate about the post. A stop block is provided within the recess defined by the circular wall and a corresponding rib is provided on the underside of the concave member to be contactable with the stop block for limiting the rotation of the movable tray about the post. A slit is formed on the inclined face adjacent to the stop block to define a cantilever type, resilient plate having a free end close to the stop block. The resilient plate is arranged to be contacted and depressed by the rib of the movable tray during mounting the movable tray to the bottom support and to prevent the movable tray from accidently disengaging from the bottom support.

These and other objects and advantages of the present invention will become more apparent from a consideration of the following detailed description of a preferred embodiment thereof, when read in conjunction with the accompanying drawings, wherein:

DETAILED DESCRIPTION OF THE PREFERRED EMBODIMENT

Figure 1:
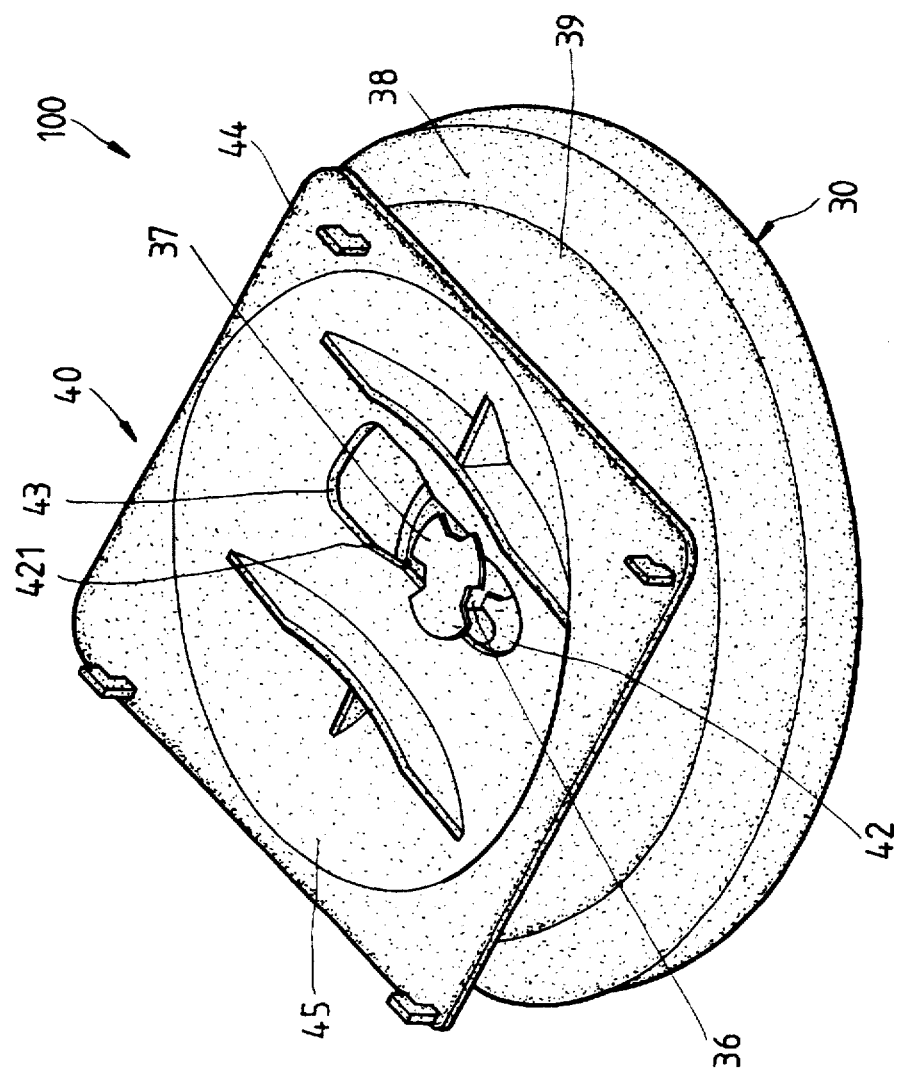
FIG. 1 is a perspective view showing a swivel base constructed in accordance with the present invention.

Referring to the drawings and in particular to FIG. 1, wherein a swivel base, particularly a swivel base for supporting a computer monitor, constructed in accordance with the present invention, generally designated with the reference numeral 100, is shown, the swivel base 100 has a two-piece structure comprising a stationary bottom support 30 to be positioned on for example a desk (not shown) and a movable tray 40 movably supported on the stationary bottom support 30 to support thereon for example a computer monitor (not shown).

Figure 2:
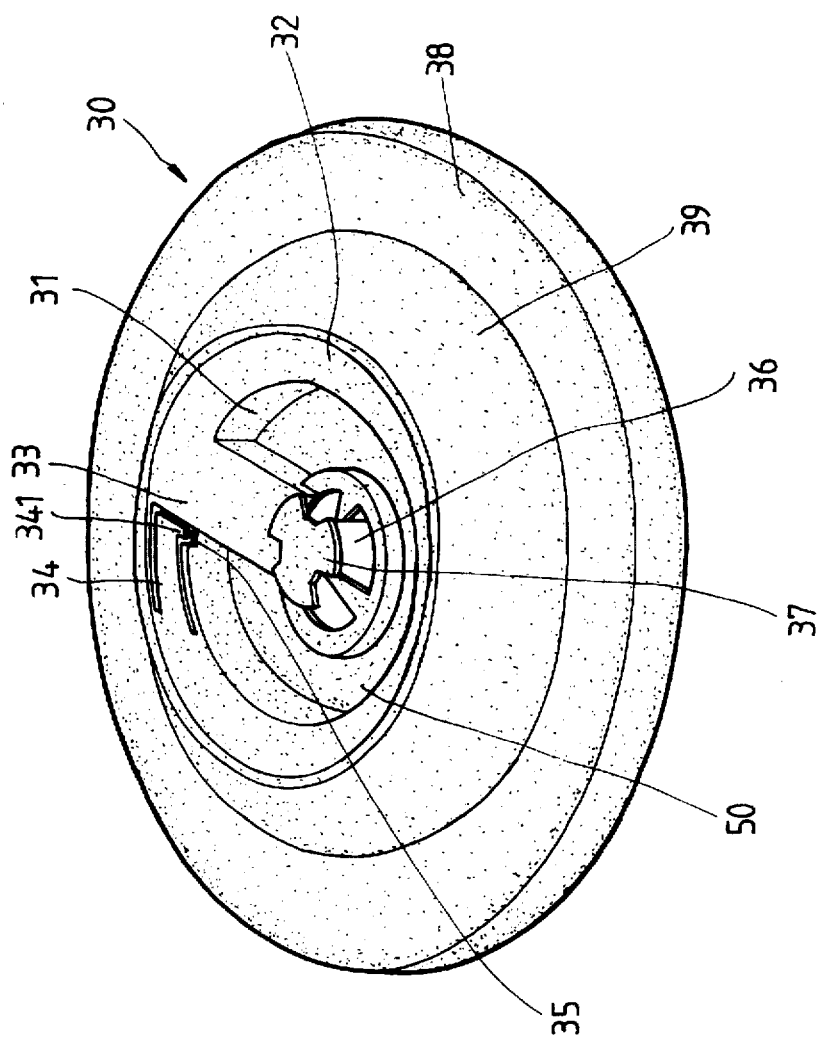
FIG. 2 is a perspective view showing a stationary bottom support of the swivel base.

The stationary bottom support 30 is particularly shown in FIG. 2, which in the embodiment illustrated comprises a circular base body 38 having a raised circular wall 39 formed thereon. Although it is shown that the base body 38 is circular, it is possible to take other shapes, such as rectangle as is more prevailing in the computer monitor base field. The circular wall 39 is preferably concentric with the circular base body 38 for aesthetic purpose and defines therein a recess 50 surrounded by the wall 39. The wall 39 defines a ring-like inclined inner face 32 which is concave corresponding to the curvature of a sphere and a substantially vertical inner face 31 connecting between the inclined face 32 and the bottom of the recess 50. Preferably, the inclined face 32 is a ring-like segment taken from the sphere. A post 36, that is spaced from the circular wall 39, extends upwards from the center of the recess 50 with a retaining member 37 formed on top end of the post 36. The retaining member 37 may be composed of a plurality of blades extending radially outward as shown in the drawings, or alternatively, the retaining member 37 may comprise a disk, so as to define an expanded top end of the post 36.

A stop block 33 extends from the circular wall 39, preferably in a radial direction, to the post 36 to bridge between the circular wall 39 and the post 36.

A resilient plate 34 is formed on the inclined face 32 immediately adjacent one side of the stop block 33 by cutting a slit around the plate 34 to form a cantilever structure so that the plate 34 has a free end closest to the stop block 33 and resiliently moveable relative to the inclined face 32 and the stop block 33 in a cantilever manner. The resilient plate 34 has a side lug 341 formed on the free end of the resilient plate 34. A recessed notch 35 is formed the vertical face 31 to correspond to the side lug 341 for limiting the downward movement of the resilient plate 34 relative to the inclined face 32.

Figure 3:
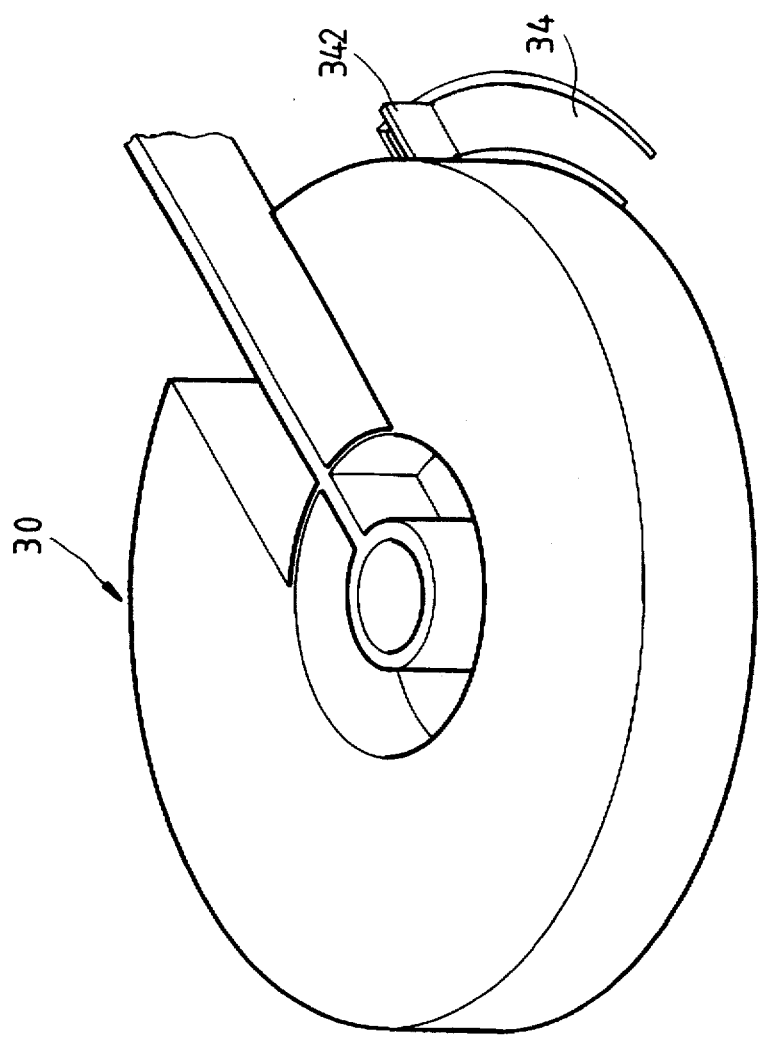
FIG. 3 is a perspective view showing a portion of the underside of the stationary bottom support of the swivel base.

Also referring to FIG. 3, wherein a portion of the underside of the stationary bottom support 30 is shown, the resilient plate 34 has a manual tab 342 provided in the proximity of the free end thereof on the underside. The manual tab 342 allows a user to move the free end of the resilient plate 34 downward.

Figure 4:
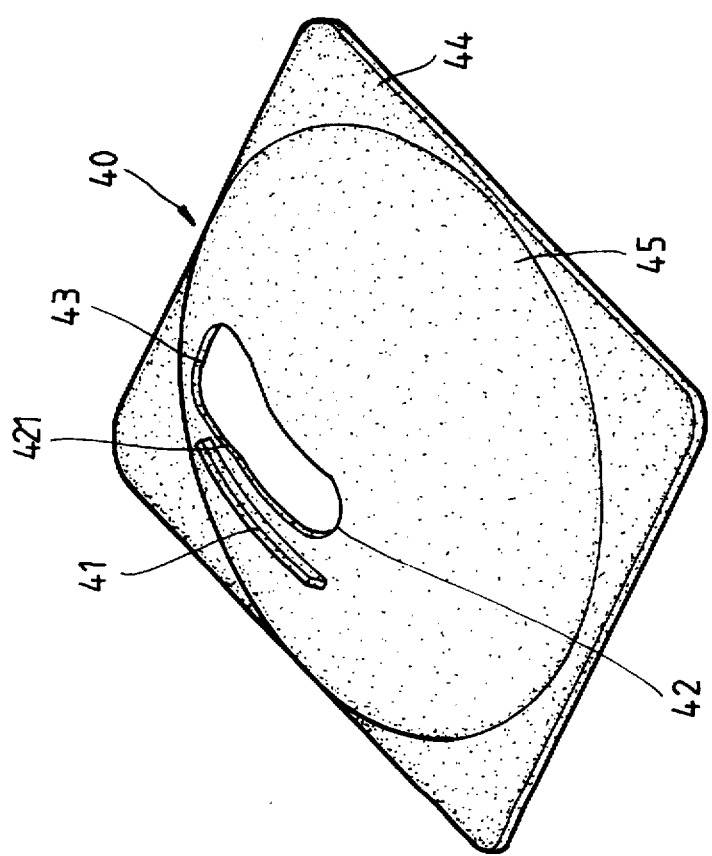
FIG. 4 is a perspective view showing a movable tray of the swivel base in an up-side-down condition.
Figure 5:
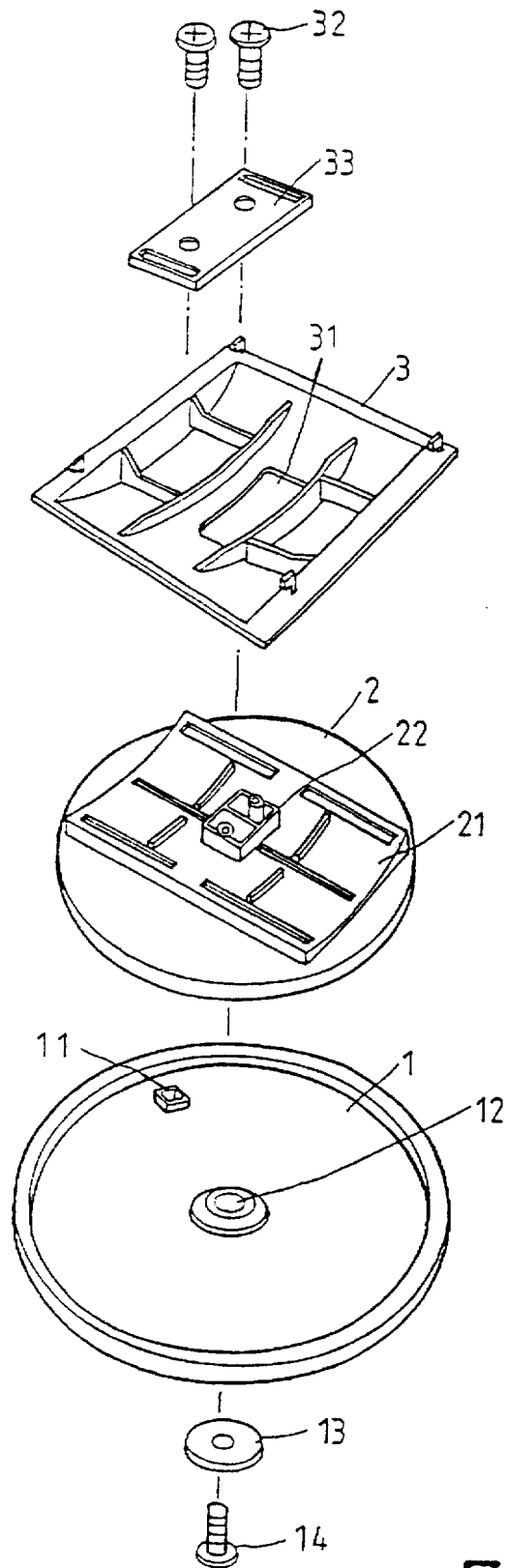
FIG. 5 shows an exploded perspective view of a prior art three-piece swivel base.
Figure 6:
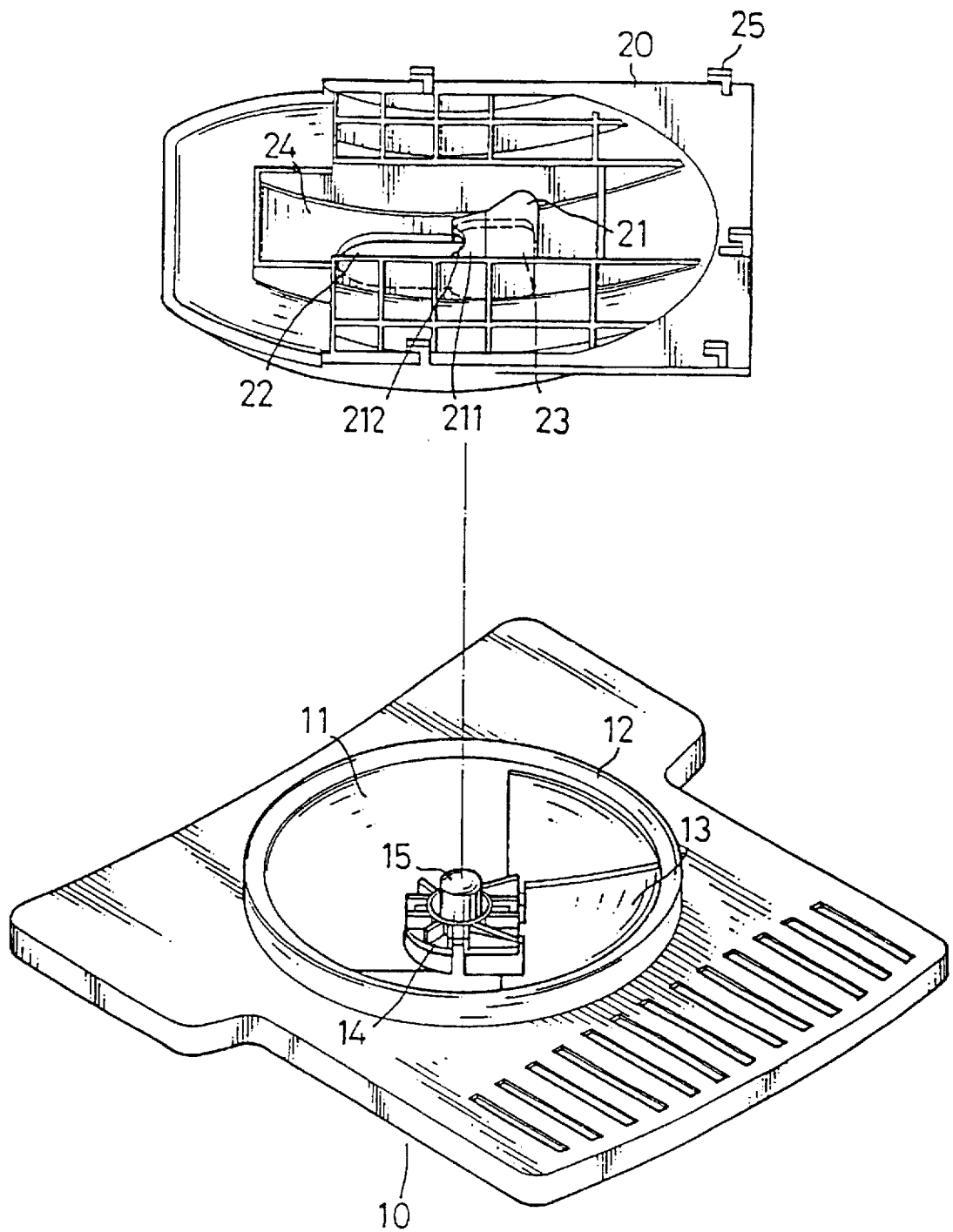
FIG. 6 shows an exploded perspective view of a prior art two-piece swivel base.

The movable tray 40 is particularly shown in FIG. 4, but in an up-side-down manner to show the detailed structure of the underside thereof. With reference to both FIGS. 1 and 4, the movable tray 40 comprises a plate body 44 having a central concave section 45 corresponding to the inclined face 32 of the circular wall 39. In other words, the concave section 45 is a portion of a sphere corresponding to the that defining the inclined face 32 so as to allow the concave section 45 to be slidably supported on the ring-like inclined face 32 of the circular wall 39.

On the concave section 45 of the movable tray 40, an elongated slot 42 preferably extending along a great circle of the sphere defining the concave section 45 and having a predetermined length is provided. The slot 42 has a width that is measured in a direction perpendicular to the length thereof smaller than an outside dimension of the retaining member 37, but larger than an outside dimension of the post 36. The slot 42 also has a widened section 43 which has a width substantially corresponding to the outside dimension of the retaining member 37 so as to allow the retaining member 37 to insert therethrough. Arc sections 421 are provided to joint the side edges of the widened section 43 to the slot 42. The concave section 45 of the movable tray 40 also has a rib 41 formed on the underside thereof to be further described.

In mounting the movable tray 40 to the stationary bottom support 30, the retaining member 37 is inserted through the widened section 43 of the slot 42 from the underside of the movable tray 40 to allow the concave section 45 to be supported on the inclined face 32. The rib 41 is so dimensioned and arranged that when the concave section 45 of the movable tray 40 is brought into contact with the inclined face 32 of the circular wall 39, the rib 41 contacts and depresses the free end of the resilient plate 34 to force the side lug 341 to move into the notch 35. The movable tray 40 is then moved relative to the stationary bottom support 30 with the sliding engagement between the underside of the concave section 45 of the movable tray 40 and the inclined face 32 of the wall 39 of the stationary bottom support 30 to have the post 36 moving along and into the slot 42. This allows the movable tray 40 to be movable and rotatable relative to the stationary bottom support 30.

Once the movable tray 40 is moved relative to the stationary bottom support 30 to have the post 36 get into the slot 42 of the concave section 45 of the movable tray 40, the rib 41 loses contact engagement with the free end of the resilient plate 34 so that the resilient plate 34 springs back to the original position where the side lug 341 limits the movement of the rib 41 of the movable tray 40 into the notch 35 and thus prevents the movable tray 40 from accidently disengaging from the stationary bottom support 30.

The rib 41 is arranged to get into contact with the stop block 33 during the rotation of the movable tray 40 to limit the rotation of the movable tray 40 relative to the stationary bottom support 30 so that the movable tray 40 is allowed to rotate at most approximately 360 degrees in either clockwise direction or counterclockwise direction.

In dismounting the movable tray 40 from the stationary bottom support 30, the user manually pulls the manual tab 342 downward, making the resilient plate 34 deform downward, to allow the rib 41 of the movable tray 40 to slide over the free end of the resilient plate 34 and thus the movable tray 40 is now disengageable from the stationary bottom support 30.

Those skilled in the art will readily recognize that various modifications of the present invention may be made without departing the scope of the present invention defined in the appended claim. Accordingly the preferred embodiment illustrated and discussed herein should be understood to be exemplary only in nature and the scope of the instant invention should be limited only by the following claims.

What is claimed is:

1. A swivel base structure comprising a bottom support adapted to be placed on a surface and a movable tray movably supported on the bottom support and adapted to support thereon an article to be swivelled, the bottom support comprising a raised circular wall defining therein a recess with a bottom and with a post extending from the bottom and at a center of a recess defined by the circular wall, the circular wall having a ring-like inner inclined face which is concave to be corresponding to a ring segment of a sphere having given radius and a substantially vertical face connecting between the inclined face and the bottom of the recess, the post having an expanded retaining member formed thereon, a slit being formed on the inclined face to define a resilient, cantilever type member which has a free end that is elastically deformably moveable relative to the inclined face, the resilient member comprises a side lug and wherein the vertical face of the bottom support has a recessed notch formed thereon and corresponding to the side lug for limiting the downward movement of the resilient member the movable tray comprising a concave member corresponding to a portion of a sphere having the substantially same radium of the sphere defining the inclined face of the wall to be supported on the inclined face of the wall, the concave member having an elongated slot formed thereon with a width smaller than the retaining member but larger than the post, the slot having a widened section having a width sufficient to receive the retaining member therethrough to allow the post to move along the slot and allow the movable tray to rotate about the post, a rib being provided on an underside of the concave section of the movable tray so that when the movable tray is supported on the inclined face of the bottom support, the rib elastically deforms the free end of the resilient member downward to define a passage for allowing the rib to slide over the resilient member and into the passage.

2. A swivel base structure comprising a bottom support adapted to be placed on a surface and a movable tray movably supported on the bottom support and adapted to support thereon an article to be swivelled, the bottom support comprising a raised circular wall defining therein a recess with a bottom and with a post extending from the bottom and at a center of a recess defined by the circular wall, the circular wall having a ring-like inner inclined face which is concave to be corresponding to a ring segment of a sphere having given radius and a substantially vertical face connecting between the inclined face and the bottom of the recess, the post having an expanded retaining member formed thereon, a slit being formed on the inclined face to define a resilient, cantilever type member which has a free end that is elastically deformably moveable relative to the inclined face, the free end of the cantilever type member being located immediately adjacent to a side of the stop block the movable tray comprising a concave member corresponding to a portion of a sphere having the substantially same radium of the sphere defining the inclined face of the wall to be supported on the inclined face of the wall, the concave member having an elongated slot formed thereon with a width smaller than the retaining member but larger than the post, the slot having a widened section having a width sufficient to receive the retaining member therethrough to allow the post to move along the slot and allow the movable tray to rotate about the post, a rib being provided on an underside of the concave section of the movable tray so that when the movable tray is supported on the inclined face of the bottom support, the rib elastically deforms the free end of the resilient member downward to define a passage for allowing the rib to slide over the resilient member and into the passage the recess defined by the circular wall comprises a stop block mounted therein to be connectable by the underside rib of the movable tray to limit the rotation of the movable tray about the post.

3. The swivel base structure of claim 2, wherein the resilient member comprises a side lug and wherein the vertical face of the bottom support has a recessed notch formed thereon and corresponding to the side lug for limiting the downward movement of the resilient member.

* * * * *